(12) United States Patent
Gallo

(10) Patent No.: US 9,743,217 B2
(45) Date of Patent: Aug. 22, 2017

(54) METHOD FOR MAKING CONTACTLESS TAGS AVAILABLE FOR END USERS OF TAG-RELATED SOFTWARE APPLICATIONS

(75) Inventor: Francesco Gallo, Graz (AT)

(73) Assignee: NXP B.V., Eindhoven (NL)

( * ) Notice: Subject to any disclaimer, the term of this patent is extended or adjusted under 35 U.S.C. 154(b) by 693 days.

(21) Appl. No.: 13/330,955

(22) Filed: Dec. 20, 2011

(65) Prior Publication Data

US 2013/0159124 A1 Jun. 20, 2013

(51) Int. Cl.
*G06Q 30/00* (2012.01)
*H04W 4/00* (2009.01)

(52) U.S. Cl.
CPC .......... *H04W 4/008* (2013.01); *H04W 4/001* (2013.01)

(58) Field of Classification Search
CPC .......... G06Q 30/0621; G06Q 30/0641; G06Q 30/0643; H04W 4/001; H04W 4/008
USPC ............................................... 705/26.1, 27.1
See application file for complete search history.

(56) References Cited

U.S. PATENT DOCUMENTS

| | | | | |
|---|---|---|---|---|
| 7,197,475 | B1* | 3/2007 | Lorenzen | G06Q 30/02 235/383 |
| 7,729,946 | B2* | 6/2010 | Chu | A63F 13/12 463/40 |
| 2002/0174018 | A1* | 11/2002 | Bunger | G06Q 20/20 705/26.8 |
| 2004/0148221 | A1 | 7/2004 | Chu | |
| 2006/0168644 | A1 | 7/2006 | Richter et al. | |
| 2008/0098085 | A1 | 4/2008 | Krane et al. | |
| 2008/0132167 | A1 | 6/2008 | Bent et al. | |
| 2008/0162305 | A1* | 7/2008 | Rousso | G06Q 10/0631 705/26.5 |
| 2008/0183593 | A1* | 7/2008 | Dierks | G06Q 20/102 705/26.35 |
| 2009/0115573 | A1 | 5/2009 | Naressi et al. | |
| 2009/0241035 | A1 | 9/2009 | Tseng et al. | |
| 2010/0030636 | A1* | 2/2010 | Vijayshankar | G06Q 20/045 705/14.33 |
| 2010/0075666 | A1 | 3/2010 | Garner | |
| 2011/0276961 | A1 | 11/2011 | Johansson et al. | |

OTHER PUBLICATIONS

May 30, 2005—http://www.rfidjournal.com/articles/view?1622.*
Apr. 21, 2010—https://web.archive.org/web/20100412101517/http://www.printronix.com/products/default.aspx?id=978.*
Oct. 2009—https://web.archive.org/web/20091003021727/http://www.cardlogix.com/support/documentation.asp.*
Extended European Search Report for Patent Appln. No. 12196713.7 (Jun. 4, 2013).
"Smart Poster Record Type Definition," Technical Specification, NFC Forum, SPR 1.1, Jul. 24, 2006.
"NFC Forum Type Tags," White Paper V1.0, NXP Semiconductors, Apr. 1, 2009.

* cited by examiner

*Primary Examiner* — Matthew Zimmerman

(57) ABSTRACT

A tag store system and method for making contactless tags available to end users of tag-related software applications is described. The system and method employs an identifier for a tag ordering interface, which is generated using tag framework data for a contactless tag associated with a tag-related software application. The tag ordering interface allows the contactless tag to be ordered using the tag ordering interface. The identifier is included in the tag-related software application and is used to request for the tag ordering interface from an end user device running the tag-related software application.

5 Claims, 5 Drawing Sheets ns technology
METHOD FOR MAKING CONTACTLESS TAGS AVAILABLE FOR END USERS OF TAG-RELATED SOFTWARE APPLICATIONS Near field communication (NFC) is a wireless technology based on radio frequency identification (RFID). NFC allows wireless connection between two devices in close proximity to each other to exchange data between the two devices. NFC also allows for a powered NFC device to generate an RF field to power a passive NFC target so that data stored in the passive NFC target can be to read out. Passive NFC targets can have simple form factors, such as stickers, tags and cards.

There are numerous uses for NFC tags. As an example, NFC tags can be used to provide information associated with posters to which the NFC tags are attached, such as webpage addresses of concerts advertised on the posters. As another example, NFC tags can be used to provide information regarding the locations of the NFC tags so that users can "check in" at designated locations by interacting with the NFC tags at the designated locations. Currently, applications for NFC-enabled devices, such as NFC-enabled smartphones, are being developed that use NFC tags to extract information from the NFC tags for various features or functionalities.

A concern for application developers is that they must make their custom NFC tags associated with NFC-related software applications available to end users of the NFC-related software applications, which may involve managing the manufacturing of the custom NFC tags and making the custom NFC tags available for purchase via their own websites or tag store websites operated by others. Thus, making the custom NFC tags available to the end users of the NFC-related software application adds complexity and challenges to the application developers. Thus, there is a need to ease the process for making custom NFC tags of NFC-related software applications available to end users of the NFC-related software applications.

A tag store system and method for making contactless tags available to end users of tag-related software applications is described. The system and method employs an identifier for a tag ordering interface, which is generated using tag framework data for a contactless tag associated with a tag-related software application. The tag ordering interface allows the contactless tag to be ordered using the tag ordering interface. The identifier is included in the tag-related software application and is used to request for the tag ordering interface from an end user device running the tag-related software application.

In an embodiment, a method for making contactless tags available to end users of tag-related software applications comprises receiving tag framework data of a contactless tag associated with a tag-related software application from an external source, the tag framework data of the contactless tag including at least one physical characteristic of the contactless tag, generating a tag ordering interface for the contactless tag using the tag framework data, creating an identifier to access the tag ordering interface, providing the identifier to the external source to be included in the tag-related software application, receiving a request for the tag ordering interface from an end user device running the tag-related software application, the request being made using the identifier for the tag ordering interface included in the tag-related software application, and providing the tag ordering interface to the end user device so that the contactless tag can be order using the tag ordering interface. The contactless tag may be an NFC tag and the tag-related software application may be an NFC-related software application.

In an embodiment, a tag store system comprises a developer interface module, a tag ordering interface generation module and an end user interface module. The developer interface module is configured to provide a developer interface to receive tag framework data of a contactless tag associated with a tag-related software application from an external source. The tag framework data of the contactless tag includes at least one physical characteristic of the contactless tag. The tag ordering interface generation module is configured to generate a tag ordering interface for the contactless tag using the tag framework data. The tag ordering interface generation module is further configured to create an identifier to access the tag ordering interface and to provide the identifier to the external source to be included in the tag-related software application. The end user interface module is configured to receive a request for the tag ordering interface from an end user device running the tag-related software application. The request is made using the identifier for the tag ordering interface included in the tag-related software application. The end user interface module is further configured to provide the tag ordering interface to the end user device so that the contactless tag can be ordered using the tag ordering interface.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the to features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
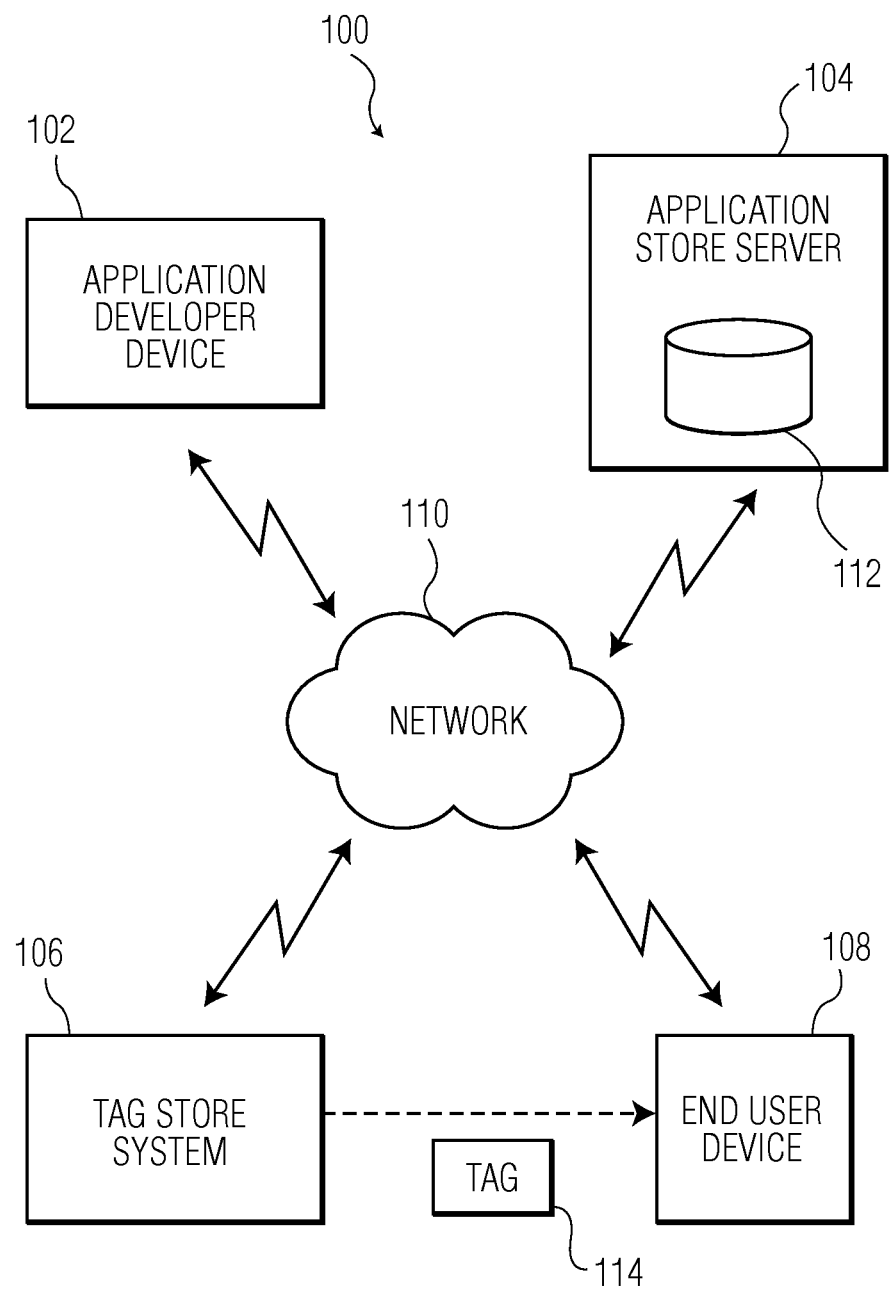
FIG. 1 is a schematic block diagram of a network environment in to accordance with an embodiment of the invention.

FIG. 1 is a schematic block diagram of a network environment 100 in accordance with an embodiment of the invention. The network environment includes an application developer device 102, an application store server 104, a tag store system 106 and an end user device 108 that can communicate with each other through a network 110. The network may include one or more private and public networks. In particular, the network may include the Internet. In the illustrated embodiment, the network environment is shown as including a single application developer device, a single application store, a single tag store system and a single end user device. However, in other embodiments, the network environment may include multiple application developer devices, multiple application stores, multiple tag store systems and multiple end user devices. As described in more detail below, the network environment allows application developers to make available custom contactless tags for their tag-related software applications to end users of the tag-related software application in an efficient manner. In particular, the network environment removes the burdensome task of managing the manufacturing and distribution of the custom contactless tags from the application developers.

As used herein, a contactless tag can be any type of a radio frequency to identification (RFID) tag or a contactless smart card. The contactless tag may be either a passive tag (i.e., tag with no internal power source) or an active tag (i.e., tag with internal power source). In an exemplary embodiment, the contactless tag described herein is a near field communication (NFC) tag that is readable and/or writable. In addition, as used herein, a tag-related software application can be any type of a software application that uses one or more contactless tags for any purpose related to the software application, such as enabling or enhancing a feature or functionality of the software application. In the exemplary embodiment, the tag-related software application described herein is an NFC-related software application that uses one or more NFC tags. Furthermore, as used herein, a tag-related software application is any software application that can run on one of the known computing platforms, such as personal computers, tablet computers and wireless mobile devices, e.g., smartphones, running one of the known operating systems, such as a Windows operating system, an Apple operating system or an Android operating system. "Windows" is a trademark of Microsoft Corporation. "Apple" is a trademark of Apple Inc. "Android" is a trademark of Google Inc.

The application developer device 102 is a computing device used by an application developer. The application developer device can be any computing device that can connect to the network 110 so that the application developer device can communicate with the tag store system 106 and the application store 104 via the network. As an example, the application developer device may be a desktop personal computer, a laptop computer, a tablet computer or a wireless mobile device, as a smartphone or a personal digital. The application developer device is used by the application developer to access the tag store system to provide tag framework data for a custom contactless tag associated with a tag-related software application being developed by the application developer. As described in more detail, the tag framework data is used to make the contactless tag corresponding to the tag framework data available to end users of the tag-related software application.

The tag framework data for a contactless tag includes information regarding the contactless tag so that the tag store system 106 is able to facilitate the manufacturing of the contactless tag. The tag framework data can be viewed to as including information that defines a particular contactless tag. As an example, the tag framework data may include the physical size of the contactless tag (e.g., business card size or smart poster size), the type of the contactless tag (e.g., sticker, business card or smart poster sheet), the integrated circuit (IC) type of the contactless tag (e.g., MIFARE ULTRALIGHT, MIFARE DESFIRE EV1 or MIFARE Classic 1k), the memory content of the contactless tag (e.g., NDEF message, access right data (read/write or read-only) and proprietary data), and the printing options for the contactless tag (e.g., front and/or back). Thus, tag framework data may include information regarding the physical characteristics of the contactless tag, including the electronics in the tag, as well as some or all of the data to be stored in the contactless tag.

The application developer device 102 is also used by the application developer to receive an identifier from the tag store system 106 for the tag framework data that was provided to the tag store system. As used herein, an identifier is defined as any pointer or address to a graphical user interface, which may be stored in any storage medium, that allows a user to order the contactless tag produced using the tag framework data. In the exemplary embodiment, the identifier is a link (hyperlink), e.g., a uniform resource locator (URL) link, to a webpage associated with the contactless tag produced using the tag framework data. This tag ordering webpage allows a user to order this particular contactless tag from the tag store system. The identifier is designed to be included in the tag-related software application being developed by the application developer. When the tag-related software application is executed, the end user of the tag-related software application is able to use the identifier in the tag-related software application to access the tag ordering interface associated with that identifier so that the end user can easily order the corresponding contactless tag from the tag store system. If the identifier is a webpage link, the webpage link may be displayed when the end user is using the tag-related software application so that the end user can click on or activate the webpage link to access the tag ordering webpage for the contactless tag, which allows the end user to easily order the contactless tag associated with the tag-related software application from the tag store system. The tag store system is described in more detail below.

The application developer device 102 may also be used by the to application developer to send the completed tag-related software application, which includes the identifier from the tag store system 106, to the application store server 104. The application store server stores the tag-related software application from the application developer device in a database 112, which may be located in any computer storage device that is accessible by the application store server. The application store server provides an online application store that is accessible via the network 110 for end users to download software applications, including the tag-related software application from the application developer device, using end user devices, such as the end user device 108.

In other embodiments, the application developer may uses different devices to provide the tag framework data to the tag store system 106, to receive the identifier from the tag store system and to upload the tag-related software application onto the application store server 104. For example, the application developer may use one device to provide the tag framework data to the tag store system and to receive the identifier from the tag store system, and may use another device to upload the tag-related software application onto the application store server.

The end user device 108 is a computing device used by an end user to download and run the tag-related software application that has been made available via the online application store provided by the application store server 104. The end user device can be any computing device that can connect to the online application store via the network 110 to download the tag-related software application. As an example, the end user device may be a desktop personal computer, a laptop computer, a tablet computer or a wireless mobile device, such as a smartphone or a personal digital assistant. In some embodiments, the end user device may include a tag reader to communicate with contactless tags. As an example, the tag reader included in the end user device may be an NFC chip. Thus, the end user device may be an NFC-enabled device.

The end user device 108 is used by the end user to install and run the tag-related software application. The tag-related software application is configured to provide a graphical mechanism that can be activated by the user of the end user device to access the tag ordering interface created by the tag store system 106 for the contactless tag associated with the tag-related software application, which allows the end user to order that contactless tag. The graphical mechanism uses the identifier provided by the tag store system so that the associated tag ordering interface is accessed when the graphical mechanism is activated. In some embodiments, the graphical mechanism provided by the tag-related software application is a link to the tag ordering webpage, where the end user can order the contactless tag associated with the tag-related software application. In these embodiments, the webpage link is the identifier provided by the tag store system and included in the tag-related software application to access the tag ordering webpage created by the tag store system to order the contactless tag associated with this tag-related software application. Thus, the end user can easily order the contactless tag associated with the tag-related software application using the graphical mechanism provided by tag-related the software application so that the end user or a person designated by the end user can receive one or more physical contactless tags 114 from the tag store system.

Figure 2:
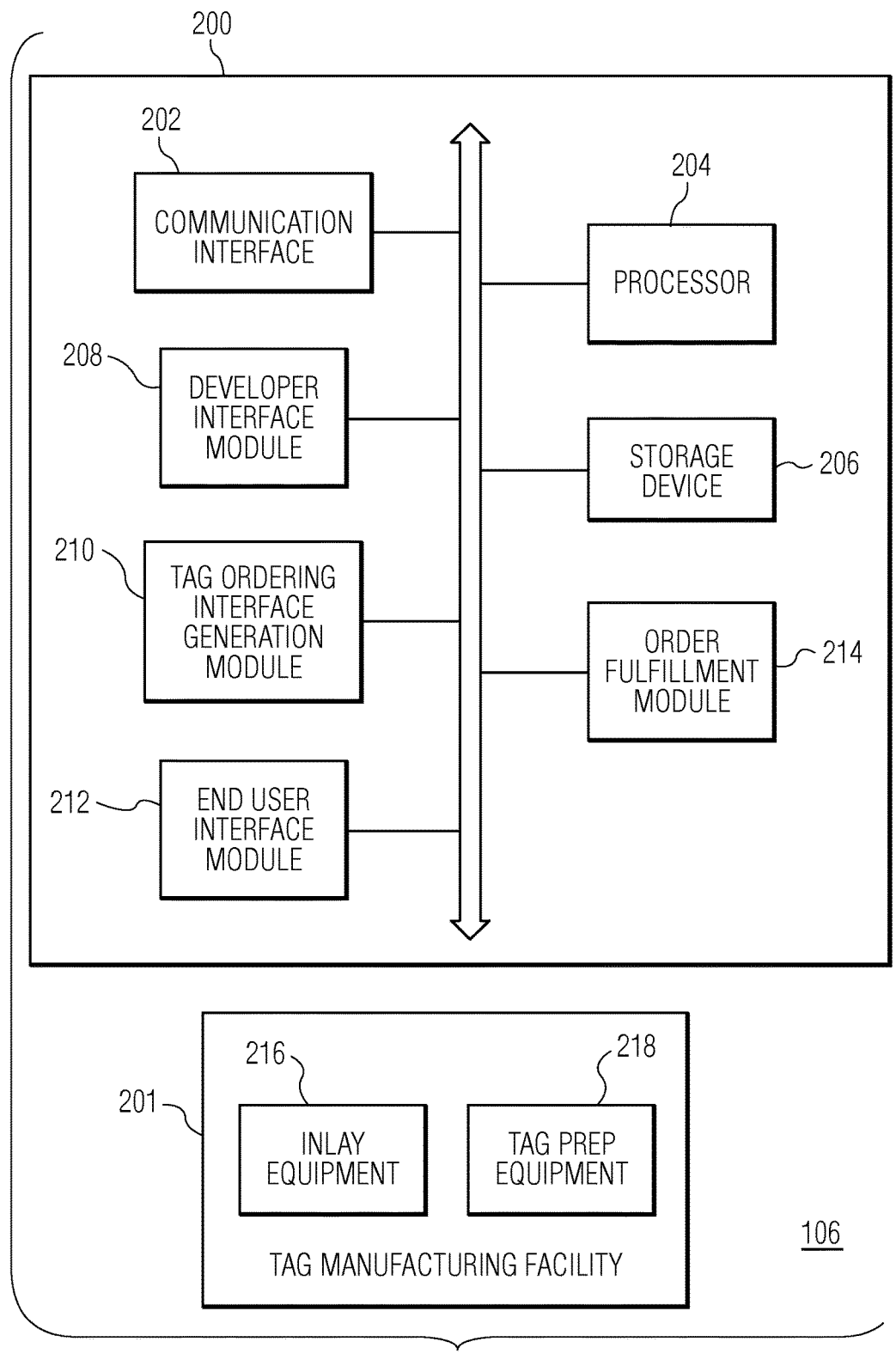
FIG. 2 is a block diagram of a tag store system in the network environment in accordance with an embodiment of the invention.

Turning now to FIG. 2, components of the tag store system 106 in accordance with an embodiment of the invention are illustrated. As shown in FIG. 2, the tag store system includes a tag store server 200 and an optional tag manufacturing facility 201. The tag store server includes a communication interface 202, at least one processor 204 and at least one computer storage device 206 that are connected to a data bus 208. The communication interface enables the tag store system to communicate with other devices in the network environment 100 via the network 110, such as the application developer device 102 and the end user device 108. The processor may include a multifunction processor and/or an application-specific processor. The processor can be any processor commonly found in a server or a computer system. The storage device can be any type of computer memory, such as read only memory (ROM), flash memory, random access memory (RAM) or a hard disk drive.

As shown in FIG. 2, the tag store system 106 further includes a developer interface module 208, a tag ordering interface generation module 210, an end user interface module 212 and an order fulfillment module 214. In some embodiments, these modules of the tag store system are implemented as software stored in a computer readable medium, such as the storage device, which is executed by the processor to perform the various functions of the modules. However, in other embodiments, the developer interface module, the tag ordering interface generation module, the end user interface module and the order fulfillment module may be implemented in any combination of software, firmware and hardware. Furthermore, in other embodiments, at least some of these modules may be integrated into one or more components of the tag store system, or one or more of these modules may be separated into multiple components of the tag store system, and may also reside in more than one server.

The developer interface module 208 of the tag store system 106 operates to provide a developer interface for an application developer device, such as the application developer device 102, to allow an application developer to interact with the tag store system. In particular, the developer interface allows an application developer to upload tag framework data for a custom contactless tag associated with a tag-related software application being developed using an application developer device, which can be viewed as an external source of the tag framework data with respect to the tag store system. In some embodiments, the developer interface may be a webpage with features for an application developer to upload tag framework data for a contactless tag associated with a tag-related software application being developed. In these embodiments, the developer interface module functions as a web server.

The tag ordering interface generation module 210 of the tag store system 106 operates to generate a tag ordering interface for each tag framework data uploaded to the tag store system. When tag framework data for a particular contactless tag is uploaded using the developer interface, the tag ordering interface generating module processes the tag framework data to generate a tag ordering interface for that particular contactless tag defined by the tag framework data. As an example, the tag ordering interface may include an image of the contactless tag produced using the information contained in the tag framework data, as well as description and/or price for the contactless tag. The tag ordering interface may also include one or more interactive items to select and order the desired quantities of the contactless tag. In some embodiments, the tag ordering interface may be a tag ordering webpage with features for an end user to order a contactless tag associated with a tag-related software application.

The tag ordering interface generation module 210 further operates to to produce an identifier for the generated tag ordering interface for the particular contactless tag. As explained above, the identifier can be any pointer or address to the generated tag ordering interface so that the identifier can be used to access that tag ordering interface. In the exemplary embodiment, the identifier is a link to the tag ordering webpage. The tag ordering interface module sends the identifier back to the application developer device or to the application developer that provided the tag framework data for the particular contactless tag. Thus, the application developer can include the identifier in the tag-related software application being developed so that end users of the tag-related software applicant can use the identifier to access the tag ordering interface for the particular contactless tag associated with the tag-related software application to order the contactless tag. In addition, the identifier can be used by the application developer to modify the tag framework data if the corresponding contactless tag needs to be modified, for example, in case of updates to the tag-related software application.

Figure 3:
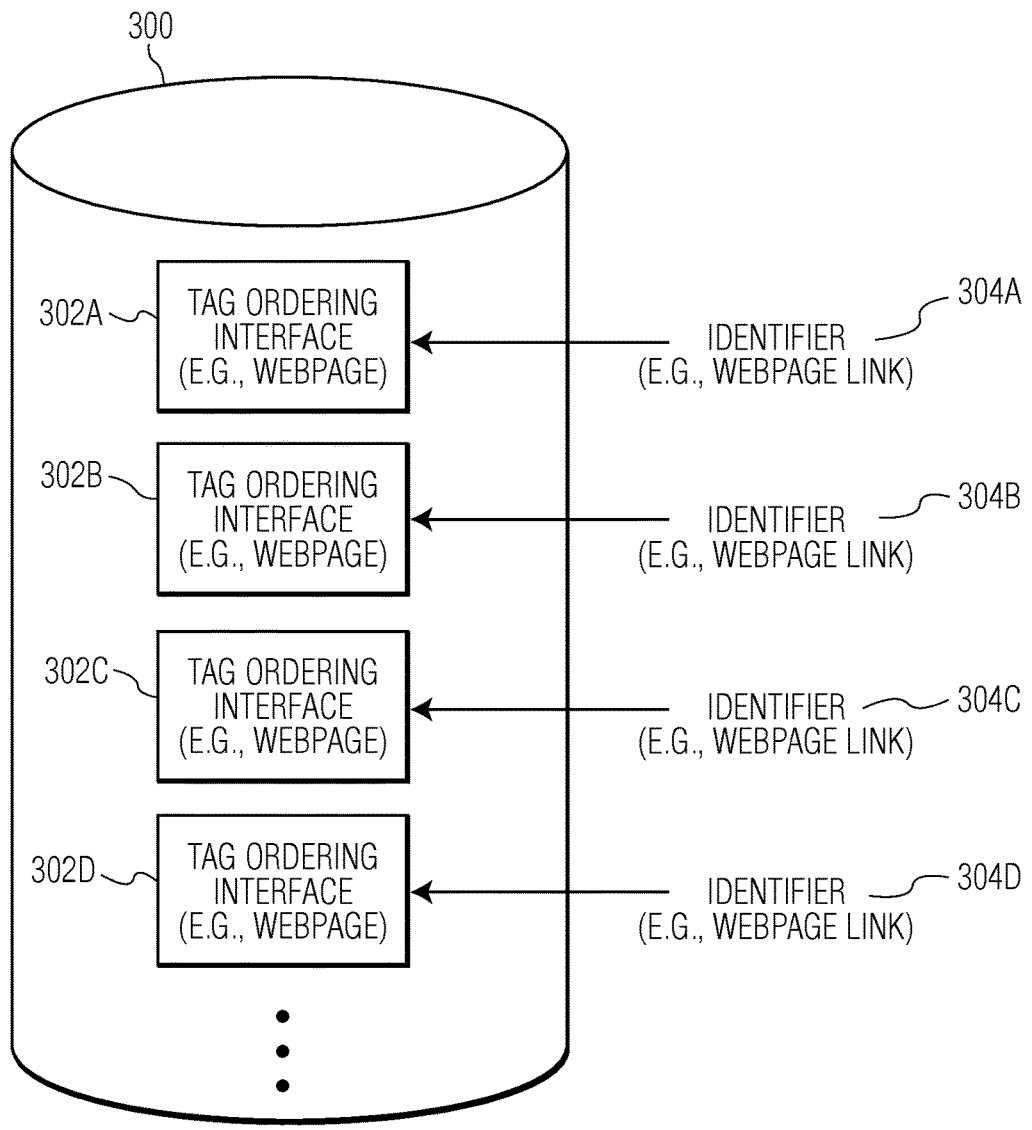
FIG. 3 is a block diagram of a database used by the tag store system in accordance with an embodiment of the invention.

The tag ordering interface generated by the tag ordering interface generation module 210 may be stored in a database in the storage device 206 of the tag store system 106 or any storage device accessible by the tag store system. FIG. 3 shows a database 300 that may be used by the tag ordering interface generation module to store a number of tag ordering interfaces 302 in accordance with an embodiment of the invention. Each of the tag ordering interfaces, e.g., tag ordering webpages, stored in the database is associated with an identifier 304, e.g., a webpage link. In the illustrated embodiment, each tag ordering interface is associated with a unique identifier that points to that tag ordering interface. Thus, each tag ordering interface can be accessed using the associated identifier for that tag ordering interface. In FIG. 3, the tag ordering interfaces 302A, 302B, 302C and 302D are shown to be associated with the identifiers 304A, 304B, 304C and 304D, respectively. Some of the tag ordering interfaces may be associated to the same tag-related software application, which means that more than one contactless tag is available for that tag-related software application. As an example, the tag ordering interfaces 304A, 304B, 304C may be associated with a first tag-related software application and the tag ordering interface 304D may be associated with a second tag-related software application. The same tag ordering interface may also be associated with more than one tag-related software application. As an to example, two different tag-related software applications may use the same contactless tag. In this example, a single tag ordering interface may be associated with both of these tag-related software applications.

Turning back to FIG. 2, the end user interface module 212 of the tag store system 106 operates to provide a tag ordering interface to an end user device, such as the end user device 108, in response to a graphical mechanism in a tag-related software application running on the end user device being activated. When the graphical mechanism in the tag-related software application is activated, a request message for the corresponding tag ordering interface is sent from the end user device to the tag store system. In response, the end user interface module sends appropriate data back to the end user device so that the requested tag ordering interface for the contactless tag associated with the tag-related software application is displayed on the end user device. In the embodiments in which the tag ordering interface is a webpage, the end user interface module sends the tag ordering webpage, i.e., data needed to display the webpage, to the end user device in response to a request for the tag ordering webpage that is sent when a link to the request webpage is activated or clicked at the ender user device running the tag-related software application. In these embodiments, the end user interface module functions as a web server.

In more complex embodiments, the tag order interface provided by the end user interface module 212 includes features that allow the end user to personalize the contactless tag. Alternatively, the tag-related software application may include a user interface that allows the end user to personalize the contactless tag and to buy the personalized contactless tag using the identifier provided by the developer interface module 208.

The order fulfillment module 214 of the tag store system 106 operates to fulfill the order for a contactless tag placed using a tag ordering interface for that contactless tag. The order fulfillment module processes the data for the tag order using the information provided through the tag order interface and performs operations necessary to deliver the ordered contactless tag to the end user or a person designated by the end user. These operations may include getting authorization from a credit card company for payment of the order, sending instructions to a manufacturing department to manufacture the requested contactless tag, and sending instructions to a shipping department to ship the requested contactless tag.

The tag manufacturing facility 201 of the tag store system 106, which may be part of the manufacture department, operates to manufacture the ordered contactless tags. In the illustrated embodiment, the tag manufacturing facility includes inlay equipment 216 and tag prep equipment 218. The inlay equipment operates to make the inlays of the ordered contactless tags, which may include embedding the IC. The tag prep equipment operates to print the ordered contactless tags, and program the memories of the contactless tags according to the corresponding tag framework data. Each of the inlay equipment and the tag prep equipment may include one or more pieces of equipment to perform their tag manufacturing functions. The inclusion of the tag manufacturing facility allows the tag store system to make generic unprinted or white contactless tags and then print and program the contactless tags to the specifications of the orders. Thus, the tag store system can not only store and deliver already manufactured contactless tags, but also manufacture the ordered contactless tags.

The tag store system 106 allows an application developer to easily customize a contactless tag associated with a tag-related software application being developed and to make the contactless tag available to end users of the tag-related software application. In addition, the tag store system allows the end users of the software application to easily order the contactless tag associated with the tag-related software application by simply accessing the tag ordering interface using the identifier for the tag ordering interface for that contactless tag that is included in the tag-related software application.

Figure 4:
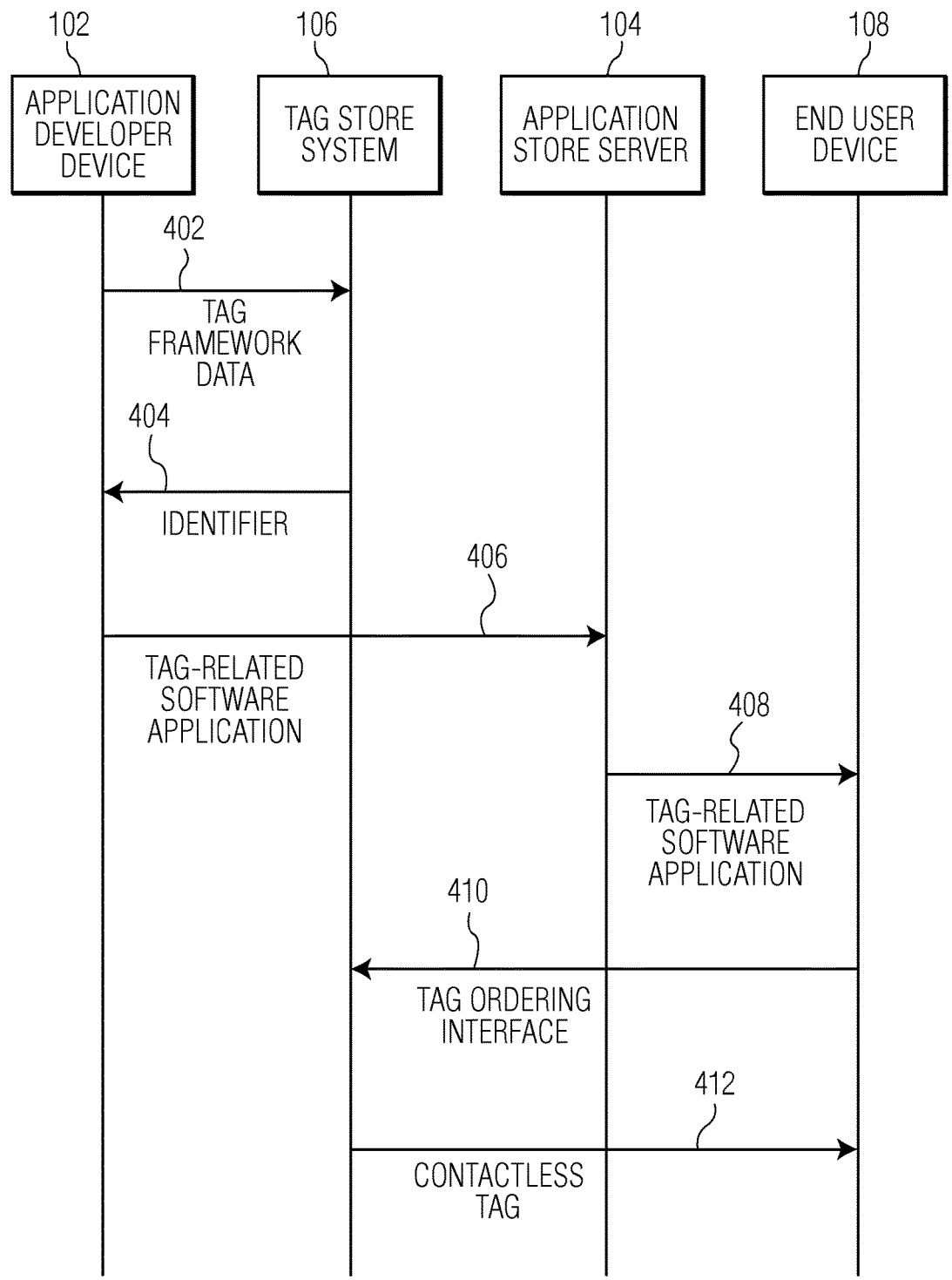
FIG. 4 is a diagram that illustrates transactions between different devices in the network environment in accordance with an embodiment of the invention.

The process of making a contactless tag for a tag-related software application available to an end user of the tag-related software application in accordance with an embodiment of the invention is now described with reference to FIG. 4, which is a diagram that illustrates transactions between different devices in the network environment 100.

The process is described herein using the application developer device 102 and the end user device 108 shown in FIG. 1 as examples.

The process begins at step 402, where an application developer using the application developer device 102 accesses the tag store system 106 and provides tag framework data to the tag store system. As explained above, the tag framework data includes information that defines a contactless tag associated with a tag-related software application being developed by the application developer. The contactless tag may be any type of contactless tag that can communicate with a reading device, such as an RFID tag or a contactless smart card. As an example, the contactless tag may be an NFC tag. In response to the tag framework data being provided by the application developer device, the tag store system generates a tag ordering interface for ordering the contactless tag corresponding to the tag framework data. In the exemplary embodiment, the tag ordering interface is a tag ordering webpage for ordering the contactless tag.

Next, at step 404, the tag store system 106 provides an identifier to access the tag ordering interface to the application developer device 102. In the exemplary embodiment, the identifier is a link to the tag ordering webpage for ordering the contactless tag. The application developer can then include the identifier, e.g., the tag ordering webpage link, in the tag-related software application being developed so that end users of the tag-related software application can order the contactless tag using the identifier included in the tag-related software application.

Next, at step 406, the application developer uploads the completed tag-related software application onto the application store server 104 using the application developer device 102. The uploaded tag-related software application is stored in the database 112. The application store server provides an online application store so that the tag-related software application and other software applications are available for download.

Next, at step 408, an end user downloads the tag-related software application from the online application store provided by the application store server 104 using the end user device 108. The end user then installs the tag-related software application in the end user device.

Next, at step 410, the end user then accesses the tag ordering interface using the identifier included in the tag-related software application. Using the tag ordering interface, the end user can easily order the contactless tag to associated with the tag-related software application. In the exemplary embodiment in which the tag ordering interface is the tag ordering webpage and the identifier is the link to that webpage, the end user accesses the tag ordering webpage by clicking on the link included in the tag-related software application.

Next, at step 412, the tag store system processes the tag order placed by the end user using the tag ordering interface and delivers the contactless tag to the end user.

Figure 5:
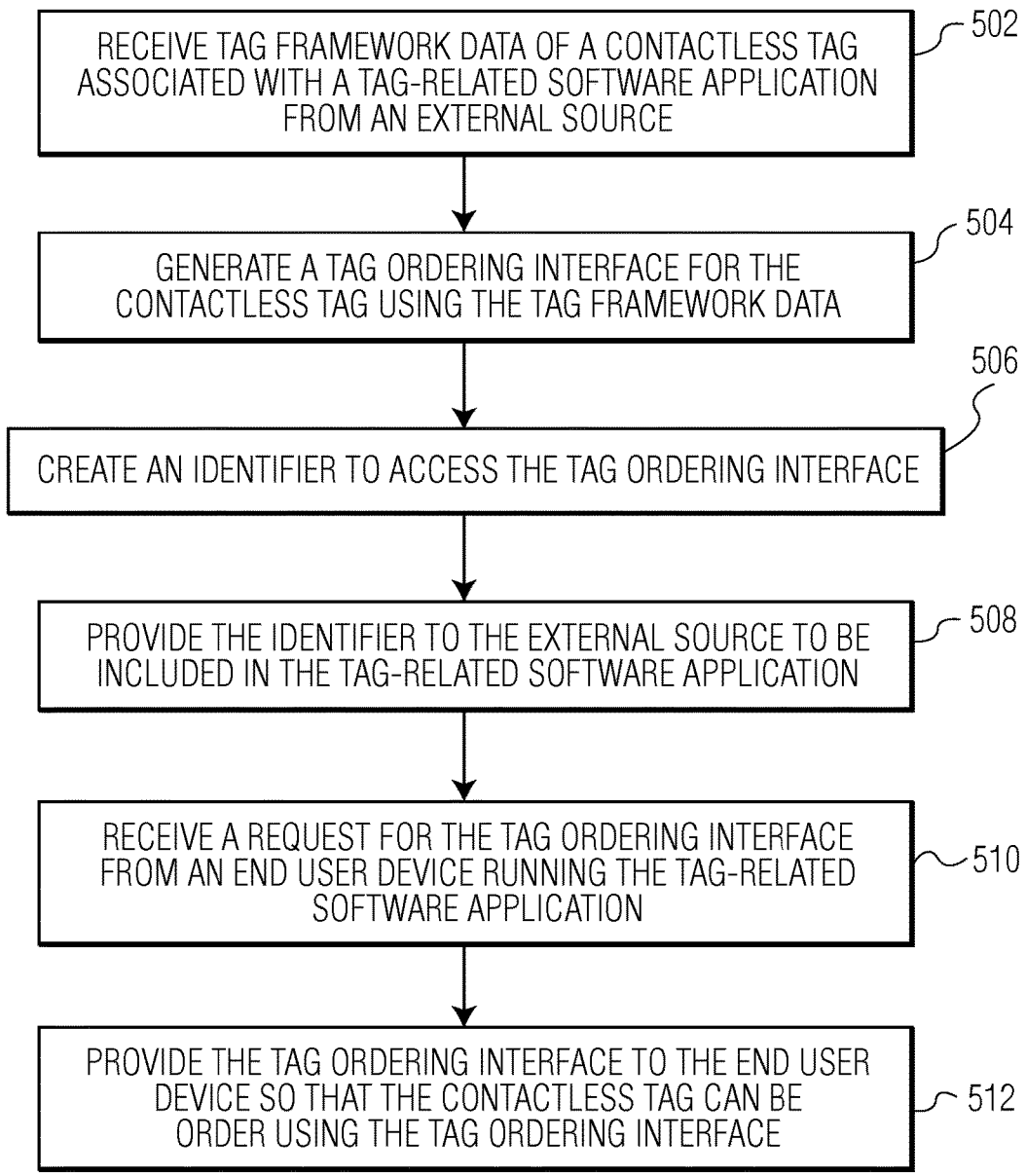
FIG. 5 is a process flow diagram of a method for making contactless tags available to end users of software applications in accordance with an embodiment of the invention.

FIG. 5 is a process flow diagram of a method for making contactless tags available to end users of tag-related software applications in accordance with an embodiment of the invention. At block 502, tag framework data of a contactless tag associated with a tag-related software application is received from an external source. The tag framework data of the contactless tag includes at least one physical characteristic of the contactless tag. In an exemplary embodiment, the contactless tag is an NFC tag. At block 504, a tag ordering interface for the contactless tag is generated using the tag framework data. At block 506, an identifier to access the tag ordering interface is created. At block 508, the identifier is provided to the external source to be included in the tag-related software application. At block 510, a request for the tag ordering interface is received from an end user device running the tag-related software application. The request is made using the identifier for the tag ordering interface included in the tag-related software application. At block 512, the tag ordering interface is provided to the end user device so that the contactless tag can be order using the tag ordering interface.

The various components or units of the embodiments that have been described or depicted may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments that have been described or depicted may be implemented in a processor, which may include a multi-function processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for making near field communication (NFC) tags available to end users of NFC-related software applications, the method comprising:
    receiving tag framework data of an NFC tag associated with an NFC-related software application being developed from an application developer device at a tag store system, the tag framework data of the NFC tag including a physical size of the NFC tag, a type of the NFC tag, an integrated circuit (IC) type of the NFC tag, memory content of the NFC tag and front and back printing options for the NFC tag;
    generating a tag ordering webpage for each tag framework data received at the tag store system by the tag store system, including a particular tag ordering webpage for the NFC tag using the tag framework data, wherein the particular tag ordering webpage comprises a plurality of features that allow an end user to personalize the NFC tag;

creating a webpage link to access the particular tag ordering webpage by the tag store system;

providing the webpage link to the application developer device by the tag store system to be included in the NFC-related software application;

uploading the NFC-related software application with the webpage link onto an application store, the application store being accessible to download software applications stored therein, including the NFC-related software application with the webpage link;

downloading the NFC-related software application from the application store to an end user device;

installing and running the NFC-related software application on the end user device, the NFC-related software application providing the webpage link to the particular tag ordering webpage to order a particular NFC tag for the NFC-related software application from the tag store system, the particular NFC tag being defined by the tag framework data;

in response to an activation of the webpage link to the particular tag ordering webpage when the NFC-related software application is running, providing the particular tag ordering webpage to the end user device that is specific to the particular NFC tag for the NFC-related software application by the tag store system, the particular tag ordering webpage being configured to allow the particular NFC tag to be personalized; and producing the personalized NFC tag by making physical inlays of the personalized NFC tag, printing the personalized NFC tag, and programming a physical memory of the personalized NFC tag.

2. The method of claim 1, wherein the providing the webpage link to the application developer device comprises providing the webpage link to the application developer device such that the webpage link can be used to modify the tag framework data in case of updates to the NFC-related software application.

3. The method of claim 1, wherein the type of the NFC tag is sticker, business card or smart poster sheet.

4. The method of claim 1, wherein the installing and running the NFC-related software application on the end user device includes installing and running the NFC-related software application on a computing device, wherein the computing device is one of a desktop computer, a laptop computer, a tablet computer and a wireless mobile device.

5. The method of claim 4, wherein the installing and running the NFC-related software application on the end user device includes installing and running the NFC-related software application on a smartphone.

* * * * *